2,858,634
FISH HOOK SETTER

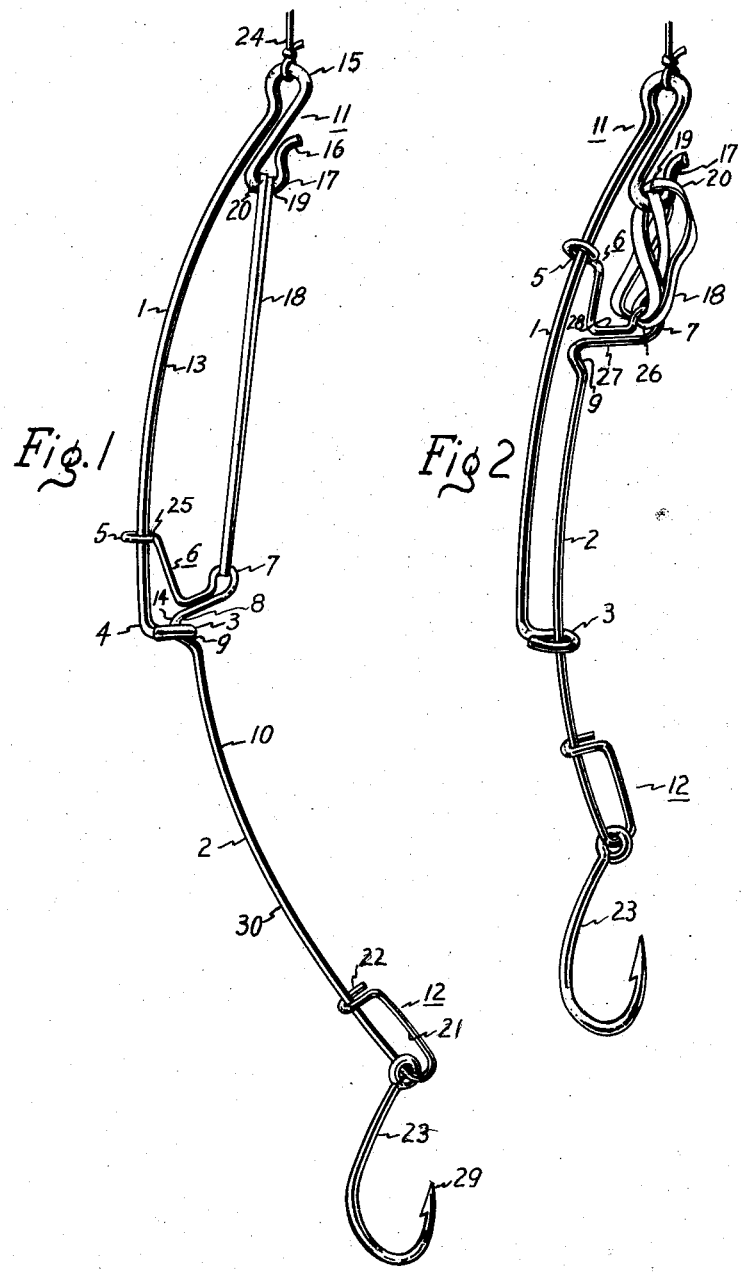

John W. Bremer, Jr., Jacksonville, Fla.

Application August 27, 1956, Serial No. 606,282

4 Claims. (Cl. 43—15)

This invention pertains to fish hook setters and more particularly to trigger devices for insertion into a fishing line which may be extended into an energized elongated condition and trigger released by a fish striking the hook to provide a sharp pull on the hook, thereby to set the hook in the mouth of the fish.

A general object of the invention is to provide an improved fish hook setter, of simplified construction, wherein ready replacement of a resilient extensible tension element is permitted, wherein the overall construction is extremely simple, compact, light in weight, sturdy, easily adjusted, easily set, reliable in function and not subject to tripping or triggering through inadvertent catching on weeds or from other causes.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

Fig. 1 is a side elevation of a hook setting device embodying the invention, the device being in set or energized condition, and Fig. 2 is a view similar to Fig. 1 but showing the device in passive condition.

Referring now to the drawings, Fig. 1 shows the device in extended or set condition, ready for triggering by a fish. As seen, the device comprises a base rod 1 and a trigger rod 2 coupled together in a slideable manner by means of a loop 3 formed at the lower end portion 4 of base rod 1 and a loop 5 at the extreme upper end of trigger rod 2. Loop 3 extends around and cages rod 2, while loop 5 extends around and cages base rod 1. The upper end portion of rod 2, generally designated by the numeral 6, is formed, by bending, to have a loop or hook 7 and to form a notch 8, comprising a shoulder 9, the notch opening toward the concave side 10 of trigger rod 2 and arranged to permit shoulder 9 to engage loop 3 in a manner to provide trigger action. It will be noted that base rod 1 and trigger rod 2 are both of gently arcuate curvature, in the case of rod 1, between its upper portion generally designated 11 and its lower portion 4 and, in the case of rod 2, between its upper portion 6 and its lower portion 12, and it will be further seen that the arcuate curvature of the rods is substantially equal and that the concave sides 10 of rod 2 and 13 of rod 1 face generally in the same direction, that is, toward the right as seen in Fig. 1.

Loop 7 is offset from rod 2 in the direction of its concave side 10 and the trigger notch 8 opens toward this direction. Notch 8 is preferably formed by a kink or sharp bend 14 in the upper portion 6 of rod 2.

Upper end portion 11 of rod 1 is folded back on itself to form a fishing line attachment loop 15 and the terminal end portion 16 of the rod is further folded upwardly to form an anchoring hook 17 for anchoring a resilient extensible tension element 18. Element 18 preferably comprises simply a single continuous rubber band which is passed through closed loop 7 and of which the opposite ends 19 and 20 are hooked over anchoring hook 17.

The lower end portion 12 of trigger rod 2 is formed into a fish hook holding loop 21 of which the end 22 is bent to hook around rod 2 and to be releasable generally in the manner of release of a safety pin to permit fish hook 23 to be engaged on and removed from loop 21.

The trigger rod 2 is preferably of somewhat resilient metal and may comprise galvanized or, if desired, uncoated steel wire material about one-sixteenth inch diameter, while the base rod 1 may be of the same or, preferably, of a steel wire of slightly greater diameter.

When the device is placed in use, being attached to fishing line 24 at loop 15, and with tension exerted between hooks 7 and 17 by rubber band 18, and with rod 2 extended as shown in Fig. 1, shoulder 9 engages against loop 3 of rod 1, the shoulder at the point of engagement being substantially perpendicular to the direction of the application of force by rubber band 18 on trigger rod 2. In this condition, the inner portion 25 of guide loop 5 will normally be in engagement with the side 13 of rod 1. If a fish now bites hook 23, exerting force in a direction away from line 24, the trigger rod 2 may tend to straighten slightly at kink 14 changing the direction of shoulder 9 and permitting rubber band 18 to pull rod 2 upwardly. Depending upon the relationship between the tension force of band 18 and the force necessary to bend rod 2 at kink 14, the downward force of hook 23 by the biting of a fish thereon may, alternatively, tend to stretch band 18 and to swing rod 2 in a direction which would be clockwise for the device viewed as in Fig. 1, the swinging being about the point of engagement between shoulder 9 and loop 3. Such swinging would, of course, tend to move edge 25 of guide loop 5 away from side 13 of rod 1. Such swinging changes the angle at which shoulder 9 engages loop 3 and permits the shoulder to slide through loop 3. While either action would be sufficient to release or trigger the device, in actual practice both actions combine, in the usual case, to provide the release of rod 2 for rapid upward motion under the influence of rubber band 18.

When triggered from the position of Fig. 1, the contracting rubber band pulls trigger rod 2 upwardly along rod 1, guide loop 5 travelling upwardly along rod 1 and trigger rod 2 moving upwardly through guide and trigger loop 3 toward the de-energized positions shown in Fig. 2. The rapid upward movement of trigger rod 2 along base rod 1 produces a sharp jerk on hook 23 which sets the hook in the mouth of the fish.

As seen in Fig. 2, guide loop 3 loosely encircles trigger rod 2 to permit free sliding of rod 2 through the loop, while guide loop 5 encircles rod 1 in a similar free sliding relatively loose manner. With the device in its passive or unset condition of Fig. 2, the rubber band 18 may take the loose form shown in Fig. 2, wherein it will be seen that the opposite ends 19 and 20 of the band are looped into hook 17, with the intermediate portions 26 of the band engaged through the loop 7. Loop 7 is preferably formed as a closed loop having legs 27 and 28 connecting it with the remaining portions of rod 2 extending in parallel and touching or substantially touching relation. Loop 7 functions, however, merely as an anchoring hook for affixing a portion of the rubber band to the upper end portion 6 of rod 2.

In order to set or cock the device into the condition of Fig. 1 from its passive condition of Fig. 2, the upper end portion 11 of rod 1 may be held in one hand while the fingers of the other hand are used to push downwardly on the guide loop 5 until shoulder 9 engages loop 3, whereupon the device will remain in the cocked position of Fig. 1 until triggered. Alternatively, the lower end portion 12 of rod 2 may be held in one hand while guide loop 3 is pushed upwardly along rod 2 until it is engaged on shoulder 9 to cock the device.

It is noted that the point 29 of the fish hook is disposed toward the inner or concave side of the arc of rods 1 and 2. It has been found that the generally arcuate shape from end to end of the device in extended condition, as shown in Fig. 1, causes it to hang while trolling with the concave sides 10 and 13 directed generally upwardly. The device, accordingly, tends to guard hook 23 from engagement with weeds or other underwater objects. It will also be apparent that engagement of trigger rod 2 with an object which may strike the convex or outer side 30 will tend to force rod 2 into a more firmly triggered condition, further engaging shoulder 9 on loop 3, rather than in the opposite direction which might cause misfiring or false triggering of the device. It will also be noted that any force applied against guide loop 5 resulting from the pulling of the device through the water by means of fish line 24 will tend toward more firm engagement of shoulder 9 on loop 3 and will not trigger the device.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A fish hook setting device comprising an elongated frame rod curved from a lower end to an upper end in a gentle arc and having an eye at said upper end for attachment to a line and having an anchoring hook adjacent said upper end, an elongated trigger rod having a fish hook attachment eye at one end and having a guide loop at the other end encircling said frame rod and slideable therealong, said frame rod comprising a guide loop at its said lower end encircling said trigger rod and slideable therealong, said trigger rod being curved between its said ends in a gentle arc at least substantially conforming to the arc of said frame rod and being longitudinally slideable therealong from a side-by-side position to an extended position with respect to said frame rod, said trigger rod having a trigger notch opening toward the concave side of its arc and engageable with said guide loop of said frame rod when said trigger rod is in said extended position, a connecting hook on said trigger rod offset toward the inner side of said arc from said notch and trigger rod, and tension spring means connected at its respective opposite ends to said anchoring hook and to said connecting hook.

2. A fish hook setting device comprising a pair of elongated bars, each bar having an upper end portion and a lower end portion, a guide loop at the lower end portion of one bar loosely encircling the other bar and a guide loop at the upper end portion of said other bar encircling said one bar, extensible tension means anchored to said upper end portion of said one bar, means for attaching a fish line to said upper end portion of said one bar, means attaching said tension means to said second bar, fish hook attachment means at the lower portion of said other bar, said upper end portion of said other bar comprising a trigger notch engageable by said guide loop of said one bar, said tension means tending to retain said upper ends adjacent each other and being extended when the device is set by pulling said guide loops toward one another and engaging said notch with said guide loop of said one bar, said other bar being resiliently yieldable at said crook whereby said crook tends to open in response to a pull on said fish hook attachment means thereby to trigger-release said other bar for movement by said tension means in a direction toward said upper end of said one bar.

3. A fish hook setting device comprising an elongated base rod having an upper end portion folded back on itself to form a line attachment loop and having the extreme end portion of said end portion folded to form an anchor hook adjacent one side of said rod, said rod having a main body portion extending in a gentle arc concave toward said side from said upper end portion and terminating in a lower end portion spaced from said upper end portion, a guide loop formed at said lower end portion extending from said concave side, a trigger rod approximately equal in length to the length of said base rod having a lower end portion looped to form a fish hook attachment and extending above said lower end portion through said guide loop and terminating in an upper end portion, the intermediate body portion between said end portions of said trigger rod extending in a gentle arc at least substantially equal to the arc of said base rod, the concave sides of said rods facing in substantially the same direction, the upper end portion of said trigger rod being bent and folded to form a trigger notch opening at the concave side of said trigger rod and an anchoring hook offset in said direction from said notch and to form at the extreme upper end a guide loop encircling the base rod between its said end portions, said notch being engageable with said guide loop of said base rod with said trigger rod in an extended position extending below the lower end portion of said base rod, and an extensible tension element engaged on said hooks and urging said trigger rod upwardly when said trigger rod is in its said extended position.

4. A fish hook setting device comprising a pair of elongated rod members, said members comprising slideable coupling means retaining said members in general alignment for sliding longitudinally with respect to one another, one of said members having line attachment means at one end thereof and the other said member being slideably extensible beyond the other end of said one member and having hook attachment means at its extended end, said coupling means comprising a guide loop formed at said other end of said one member encircling said other member between its ends and a second guide loop formed at the other end of said other member encircling said one member between its said ends, resilient tension means attached to respective portions of said members which are separated upon such slideable extension of said other member and which approach each other upon sliding retraction of said other member, and trigger means comprising a respective catch element on each said member, said elements being engaged when said other member is extended, one of said elements comprising a shoulder formed on said other element and the other of said elements comprising a portion of said slideable coupling means on the said one member, said other member being bowed between said hook attachment means and said shoulder whereby said shoulder and other element tend to rotate about said engaged elements in response to application of an external pulling force on said hook attachment means.

References Cited in the file of this patent
UNITED STATES PATENTS
2,631,399    Sowa    Mar. 17, 1953
FOREIGN PATENTS
171,951    Austria    July 25, 1952
1,097,052    France    Feb. 9, 1955